(12) United States Patent
Jeong et al.

(10) Patent No.: US 7,864,213 B2
(45) Date of Patent: Jan. 4, 2011

(54) APPARATUS AND METHOD FOR COMPENSATING TREMBLING OF A PORTABLE TERMINAL

(75) Inventors: Wook-Hyun Jeong, Suwon-si (KR); Jong-Cheul Park, Jeonranam-do (KR)

(73) Assignee: Samsung Electronics Co., Ltd. (KR)

( * ) Notice: Subject to any disclaimer, the term of this patent is extended or adjusted under 35 U.S.C. 154(b) by 441 days.

(21) Appl. No.: 11/867,447

(22) Filed: Oct. 4, 2007

(65) Prior Publication Data

US 2008/0084480 A1    Apr. 10, 2008

(30) Foreign Application Priority Data

Oct. 4, 2006    (KR) ............... 10-2006-0097533

(51) Int. Cl.
    *H04N 5/228* (2006.01)
(52) U.S. Cl. ............... 348/208.4; 348/208.99
(58) Field of Classification Search ........... 348/208.99, 348/208.1, 208.4, 208.6
    See application file for complete search history.

(56) References Cited

U.S. PATENT DOCUMENTS

| | | | |
|---|---|---|---|
| 2002/0163581 A1* | 11/2002 | Kitazawa et al. | 348/208.6 |
| 2002/0196849 A1* | 12/2002 | Kamikura et al. | 375/240.08 |
| 2003/0118108 A1* | 6/2003 | Shin et al. | 375/240.19 |
| 2004/0071210 A1* | 4/2004 | Amara et al. | 375/240.01 |
| 2005/0046737 A1* | 3/2005 | Terai et al. | 348/342 |
| 2005/0084011 A1* | 4/2005 | Song et al. | 375/240.12 |
| 2006/0140481 A1* | 6/2006 | Kim et al. | 382/190 |

FOREIGN PATENT DOCUMENTS

KR    1020050039950    5/2005

* cited by examiner

*Primary Examiner*—Kelly L Jerabek
(74) *Attorney, Agent, or Firm*—The Farrell Law Firm, LLP

(57) ABSTRACT

A method for trembling compensation of a portable terminal includes obtaining a first image having lower brightness and a second image having higher brightness, the lower and higher brightness being different, by adjusting an iris when an image photograph event occurs, computing motion vectors at respective regions of the first and second images and generating search matrices of the respective regions of the first and second images, searching locations having a similar saturation in the search matrices of the first and second images, and compensating saturation and brightness of the first image having a lower brightness, using the searched locations.

15 Claims, 7 Drawing Sheets

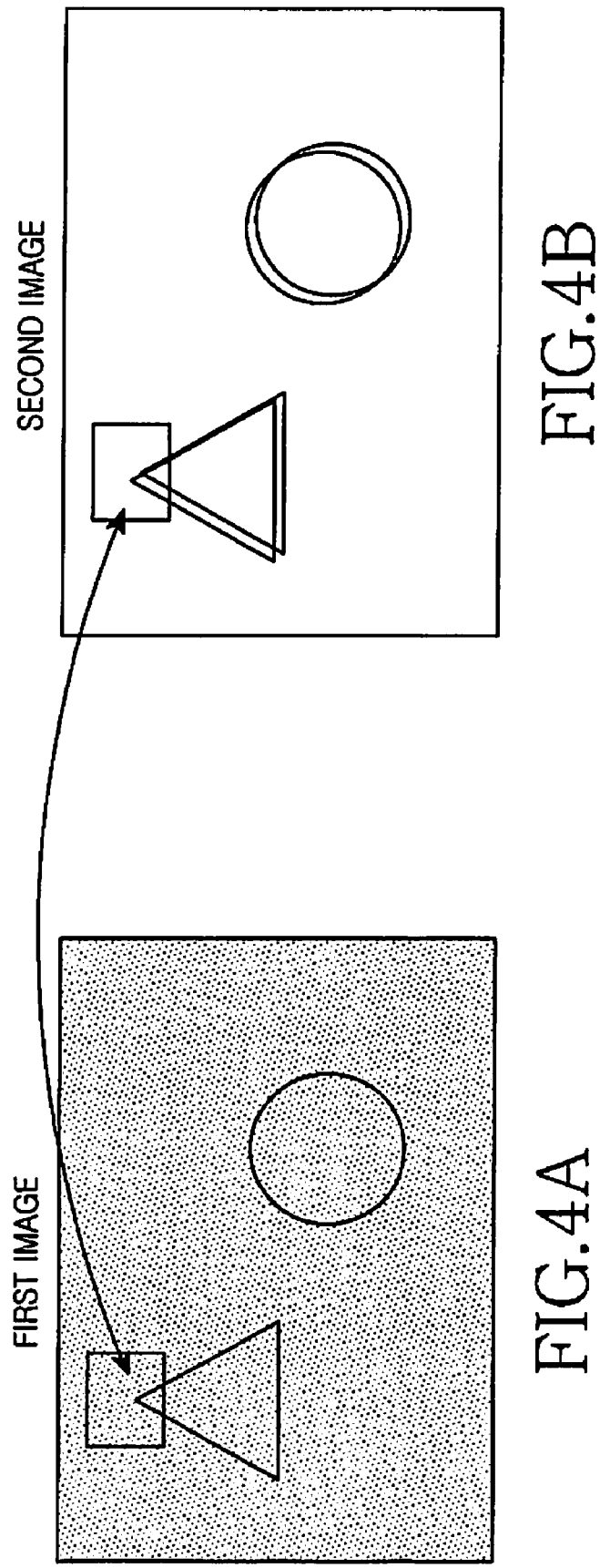

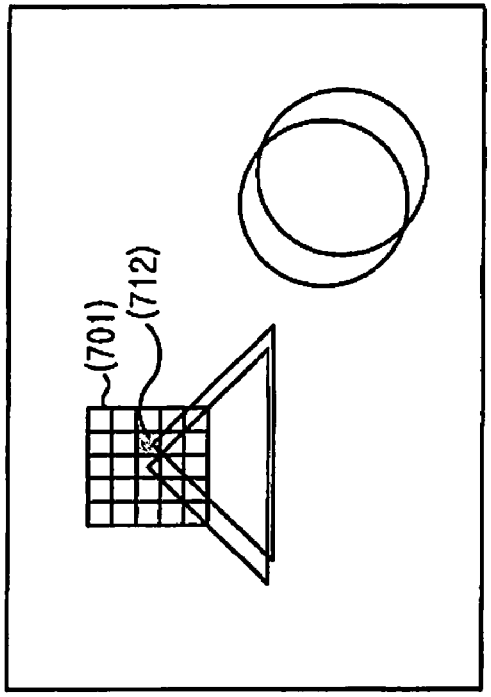
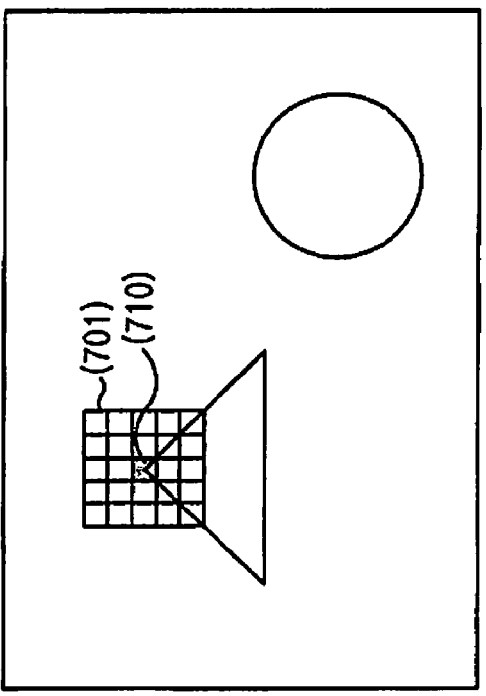
FIG.7B
FIG.7A

APPARATUS AND METHOD FOR COMPENSATING TREMBLING OF A PORTABLE TERMINAL

PRIORITY

This application claims priority under 35 U.S.C. §119 to an application filed in the Korean Intellectual Property Office on Oct. 4, 2006 and assigned Serial No. 2006-97533, the contents of which are incorporated herein by reference.

BACKGROUND OF THE INVENTION

1. Field of the Invention

The present invention generally relates to an apparatus and method for trembling compensation of a portable terminal, and more particularly, to an apparatus and method of trembling compensation of a portable terminal, which takes into consideration degrees of trembling at respective regions of an image captured through a portable terminal.

2. Description of the Related Art

The development of Very Large Scale Integration (VLSI) and computing technology have brought various types of smaller and thinner products.

Demands for smaller and thinner potable terminals have also exploded, and manufacturers are adding a variety of functions to portable terminals to further increase user convenience. These added functions include, for example, telephone number directory, game, scheduler, morning call, Moving Picture Expert Group (MPEG) layer 3, motion picture player, digital camera, etc.

Among these, a digital camera function is now an almost essential element mounted on portable terminals. However, because a portable terminal mounts a variety of different functions altogether, a digital camera of such portable terminal provides a degraded grab function to instantly capture an image. Accordingly, a digital camera of portable terminal often provides a shaky image, caused due to movement of a user who takes the photo.

Therefore, a need exists for a method which can stabilize an image when the image is shaken due to movement of a hand. A variety of image stabilizing methods, which have already applied to digital cameras, have been suggested for portable terminals. However, because these methods do not consider movement varying in degree according to each region of a captured image, problems of a shaking image remains unsolved when these methods are applied to an image having different degrees of movements in respective regions.

SUMMARY OF THE INVENTION

The present invention substantially solves at least the above problems and/or disadvantages and provides at least the advantages below. Accordingly, an aspect of the present invention is to provide an apparatus and a method for compensating a trembling of an image in a portable terminal.

Another aspect of the present invention is to provide an apparatus and method for compensating trembling of a portable terminal, which considers degrees of movement at respective regions of an images, when the images are photographed through the portable terminal.

According to a first aspect of the present invention, a method for compensating trembling of a portable terminal includes obtaining a first image having lower brightness and a second image having higher brightness, the lower and higher brightness being different, by adjusting an iris when an image photograph event occurs, computing motion vectors at respective regions of the first and second images and generating search matrices of the respective regions, searching locations having a similar saturation in the search matrices of the first and second images, and compensating saturation and brightness of the first image having a lower brightness, using the searched locations.

According to a second aspect of the present invention, an apparatus for compensating trembling of a portable terminal includes a camera for obtaining a first image having lower brightness and a second image having higher brightness, the lower and higher brightnesses being different by adjusting an iris when an image photograph event occurs, and an image processing unit for computing motion vectors at respective regions of the first and second images and generating search matrices of the respective regions, searching for similar locations in the search matrices of the first and second images, and compensating saturation and brightness of the first image having a lower brightness, using the similar locations.

BRIEF DESCRIPTION OF THE DRAWINGS

The above and other objects, features and advantages of the present invention will become more apparent from the following detailed description when taken in conjunction with the accompanying drawings in which:

FIGS. 4A and 4B are views illustrating an example of computing motion vectors of respective regions of two images obtained through a portable terminal according to the present invention;

FIGS. 7A and 7B are views illustrating an example of compensating an image using search matrices of two images in a portable terminal according to the present invention.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would unnecessarily obscure the present invention.

An apparatus and a method for compensating a trembling of an image taken through a portable terminal by considering degrees of the trembling at respective regions according to the present invention will now be explained.

Figure 1:
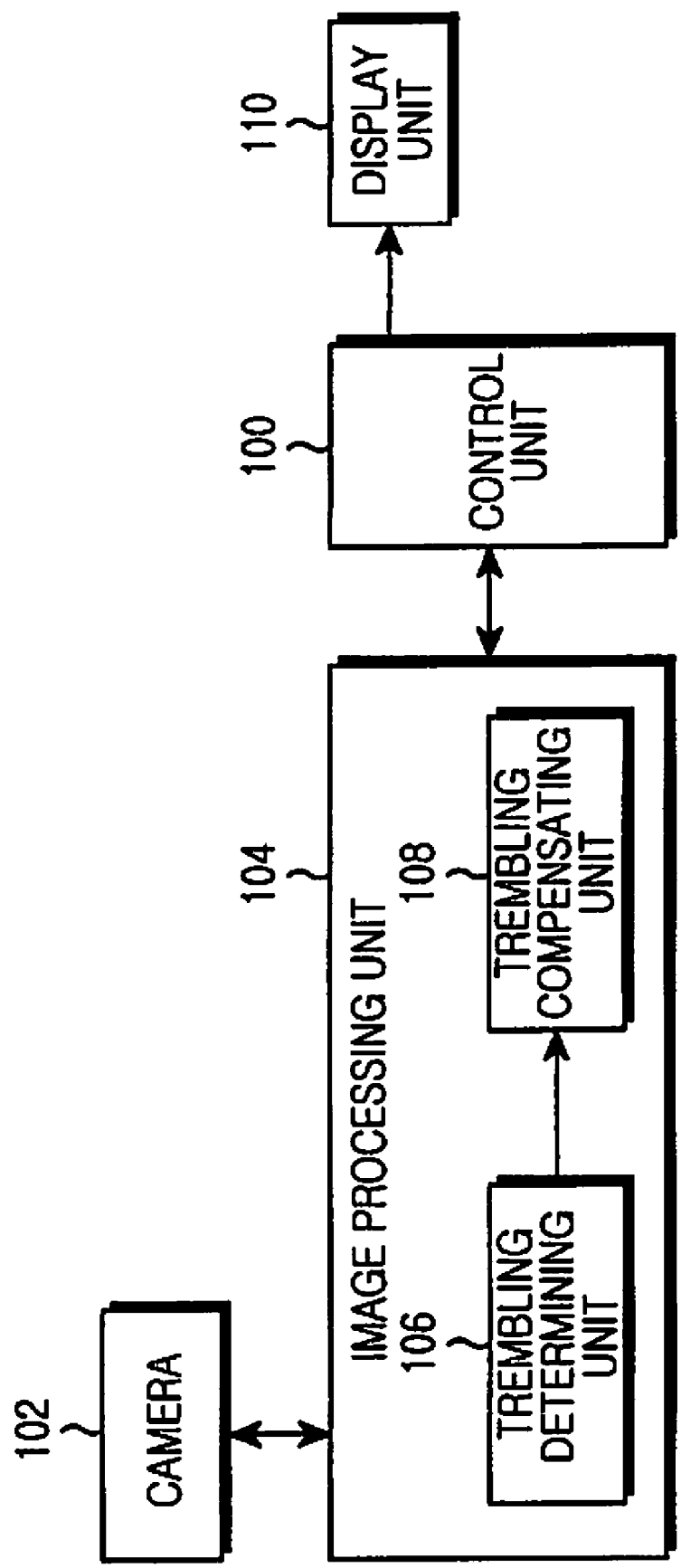
FIG. 1 is a block diagram of a portable terminal according to the present invention.

FIG. 1 shows a portable terminal according to the present invention. The portable terminal includes a control unit 100, a camera 102, an image processing unit 104, a trembling determining unit 106, a trembling compensating unit 108, and a display unit 110.

The control unit 100 performs processing and control related to audio and data communications, and when a photograph event occurs, according to the present invention, the control unit 100 determines whether a trembling compensating function is set, and outputs an image capture and trembling compensation signal to the image processing unit 104 when a trembling compensating function is set. Additionally, the control unit 100 receives a trembling-compensated image from the image processing unit 104 and outputs the received image to the display unit 110.

The camera 102 includes a camera sensor for converting an optical signal being detected at image photographing into an electric signal, and a signal processing unit for converting an analog image signal being captured through the camera sensor into digital data. More specifically, the camera 102 obtains two images of different brightness by adjusting an iris according to a control of the image processing unit 100, and provides the image processing unit 104 with the obtained images. That is, the camera 102 obtains a first image, which has less trembling and lower brightness and thus is darker, by closing the iris at shorter intervals, and obtains a second image, which has more trembling and higher brightness and is thus brighter, by closing the iris at longer intervals.

The image processing unit 104 processes the image signal output from the camera 102 according to frame units, and outputs a signal suiting characteristics and size of the display unit 110. Additionally, the image processing unit 104 includes an image coder/decoder (codec) for coding the image signal according to a coding scheme, or decoding the coded frame image data into original frame image data. According to the present invention, in response to an image capture and trembling compensation signal being input from the control unit 100, the camera 102 may be controlled to obtain two images, that is, first and second images, of different brightness, compensate the movement of the obtained images using the trembling determining unit 106 and the trembling compensating unit 108, and output the compensated images to the control unit 100.

Figures 5A, 5B:
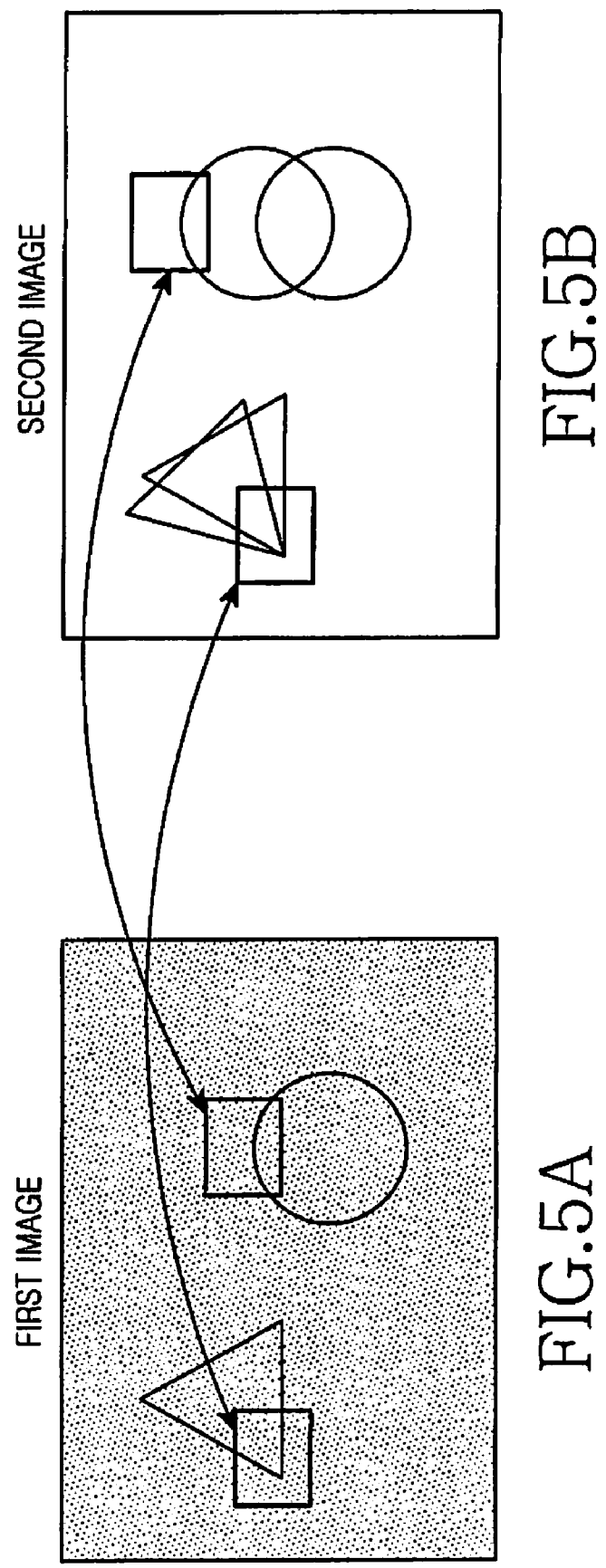
FIGS. 5A and 5B are views illustrating an example of computing different motion vectors of the respective regions of two images obtained through a portable terminal according to the present invention.

The trembling determining unit 106 computes motion vectors of respective regions of the first and second images, and determines whether a trembling has occurred, by comparing a maximum motion vector of the computed motion vectors with a reference trembling value. The trembling determining unit 106 computes motion vectors of the respective regions of the images, to deal with not only the image trembling in uniform degree, as shown in FIGS. 4A and 4B, but also the image trembling in varying degrees in respective regions of the images, as shown in FIGS. 5A and 5B. Upon determination that trembling has occurred, the trembling determining unit 106 compares a maximum motion vector with a reference compensation value and determines whether trembling compensation is possible. Upon determination that trembling compensation is possible, the trembling determining unit 106 provides the trembling compensating unit 108 with the first and second images and the motion vectors.

Figure 6B:
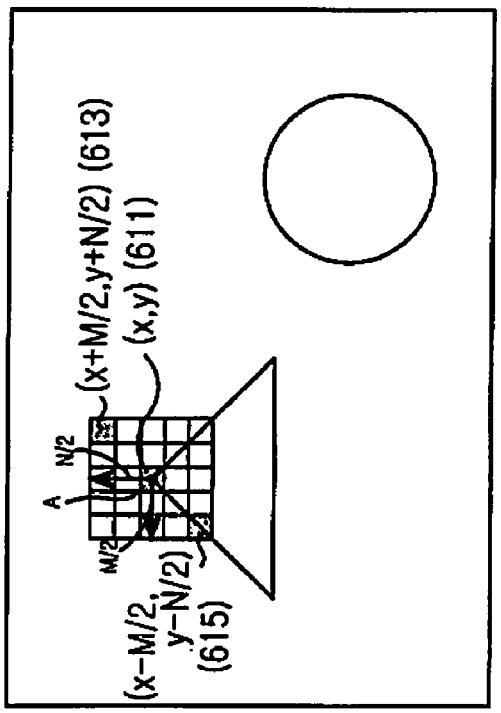
FIGS. 6A and 6B are views illustrating search matrices based on the motion vectors of a portable terminal according to the present invention.
Figure 6A:
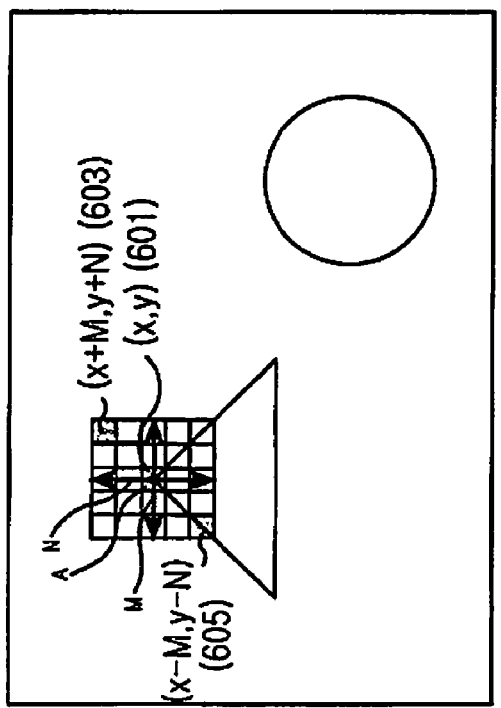

The trembling compensating unit 108, upon receipt of the first and second images and the motion vectors from the trembling determining unit 106, measures the brightness and saturation of each pixel of the two images in color space, and generates search matrices of respective regions based on the motion vectors of the respective regions. For example, as shown in FIGS. 6A and 6B, if motion vector in region A is (M, N), a search matrix in rectangular configuration may be generated, which includes either (x+M, y+N) 603 and (x−M, y−N) 605, or (x+M/2, y+N/2) 613 and (x−M/2, y−N/2) 615, with respect to a reference point (x, y) 601 and 611 corresponding to region A. The brightness and saturation may be measured using appropriate models, such as a Hue, Saturation, Intensity model or the like.

The trembling compensating unit 108 then searches for the pixels in the search matrices of the first and second images having a similar saturation, to find out a point representing the same location of an object of the two images. Referring to FIGS. 7A and 7B, if a 5×3 search matrix 701 is generated based on the first image of low brightness and the second image of high brightness, a pixel 712 which has the closest saturation to that of a pixel 710 of the search matrix 701 of the first image, is searched in the search matrix of the second image. The trembling compensating unit 108 estimates a compensated saturation based on the two pixels searched from the first and second images, compensates the saturation of the corresponding pixel of the first image based on the estimated saturation, and compensates the brightness of the corresponding pixel of the first image to the brightness of the corresponding pixel of the second image. The compensated saturation of the first image may be obtained by averaging saturations of two pixels searched from the same point of the two images, or alternatively, the greater or smaller saturation of the two pixels may be selected as the compensated saturation. The first image has less trembling and represents a clear boundary between the object and the background by closing the iris at short intervals, and the second image has more trembling and represent a rather unclear boundary between the object and the background by closing the iris at relatively longer intervals. In this case, a stabilized image, which is compensated for the trembling, can be obtained, by changing saturation and brightness of the first image based on the second image.

The display unit 110 displays status information generated during the operation of the portable terminal, limited number of figures and texts, and motion pictures and still pictures. The display unit 110 also receives a trembling-compensated image from the control unit 100 and displays the received image.

Figure 2:
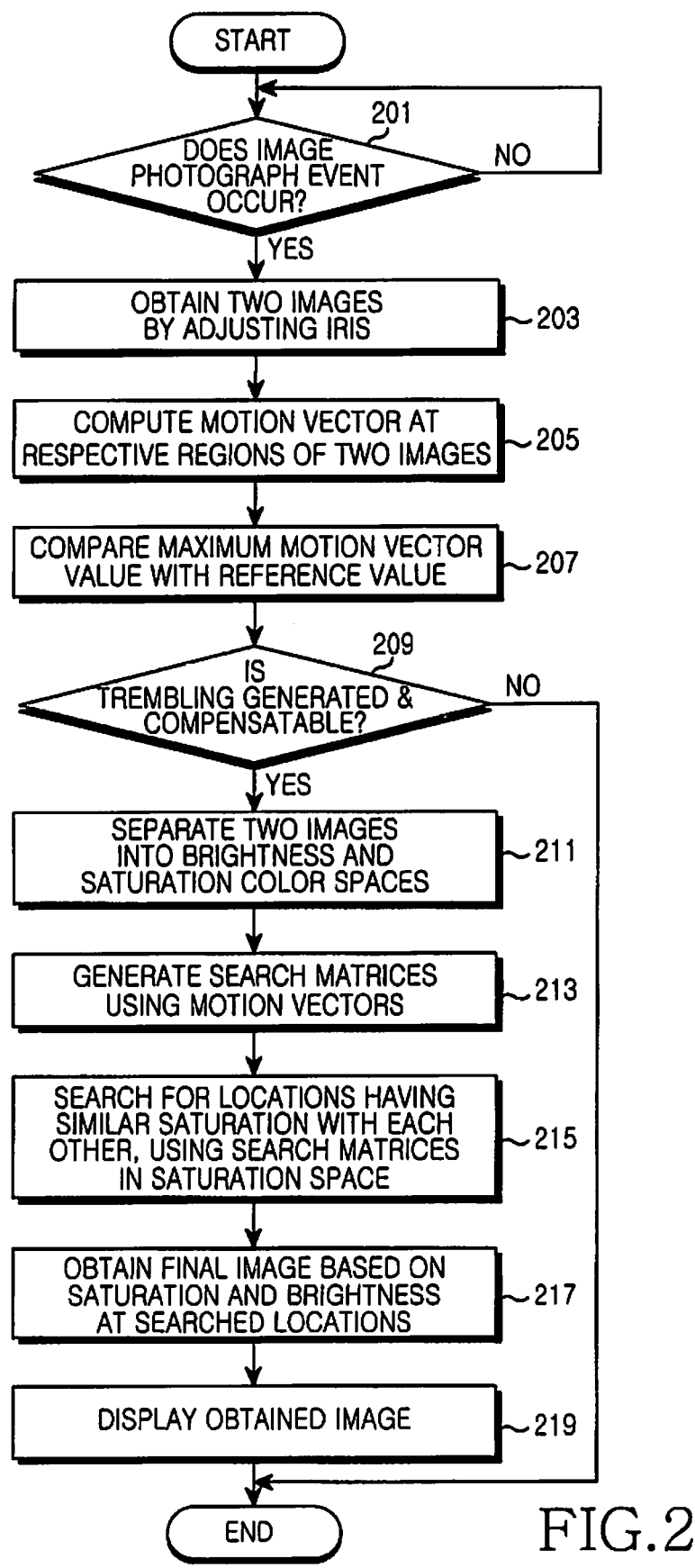
FIG. 2 is a view illustrating a process of compensating a trembling of an image taken through a portable terminal according to the present invention.
Figure 3B:
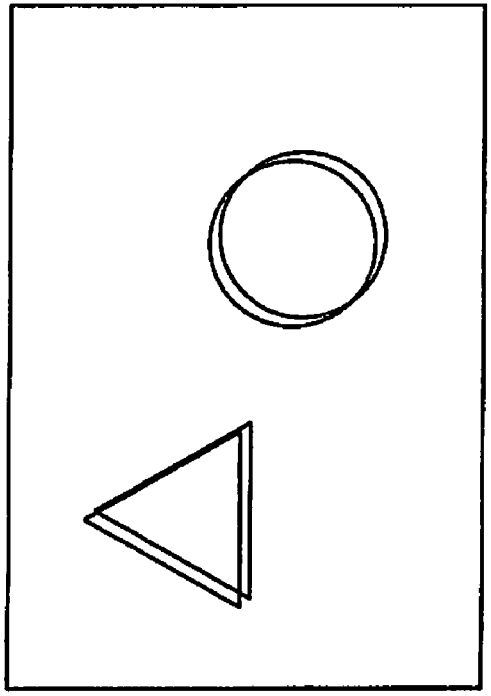
FIGS. 3A and 3B are views illustrating two images obtained according to the adjustment of iris of a portable terminal according to the present invention.
Figure 3A:
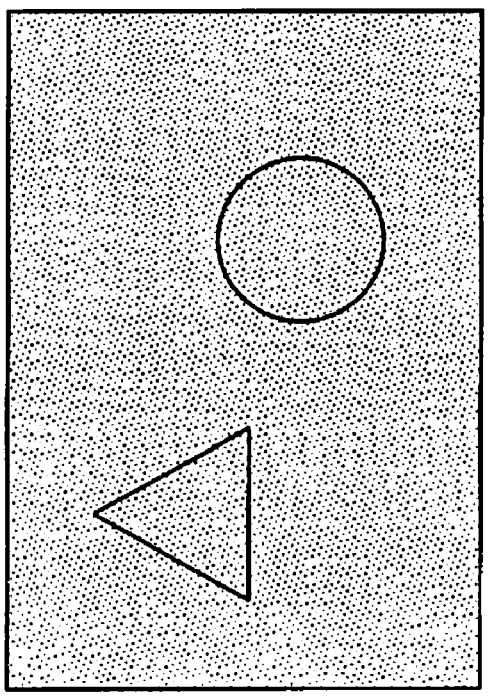

FIG. 2 shows a process of compensating a trembling of an image, while an image is taken through a portable terminal according to the present invention. The portable terminal determines whether an event of photographing an image occurs in step 201. Upon determination that an image photograph event occurs, the portable terminal obtains two images of different brightness, by adjusting the iris in step 203. That is, the portable terminal obtains a first image, which has less trembling and lower brightness and thus is darker, by closing the iris at shorter intervals, and obtains a second image, which has more trembling and higher brightness and is thus brighter, by closing the iris at longer intervals.

The portable terminal computes the motion vectors of the respective regions of the first and second images of varying brightness. The portable terminal computes the motion vectors of the respective regions of images, to deal with not only the image trembling in uniform degree, as shown in FIGS. 4A and 4B, but also the image trembling in varying degrees in the respective regions of the image, as shown in FIGS. 5A and 5B.

After the computation of the motion vectors, the portable terminal compares the maximum motion vector of the computed motion vectors with a trembling reference value and a compensation reference value in step 207, and proceeds to step 209 to determine whether trembling has occurred and whether image compensation is possible, according to a comparison result. If the comparison result indicates that no trembling has occurred, or that the trembling has occurred but is not possible to compensate, the process according to the present invention is terminated. If the trembling has not occurred, the portable terminal may display the second image of higher brightness on the display unit 110. If the trembling has occurred, but is too severe to compensate, the portable terminal may display a message on the display unit 110, indicating that the trembling exceeds a compensation range with, for example, a maximum trembling value.

If the comparison result indicates that the trembling has occurred and that the trembling is compensatable, the portable terminal measures the brightness and saturation of the pixels in the color space of the two images, using an appropriate model, such as the previously described Hue, Saturation, Intensity model or the like, and proceeds to step 213 to generate a search matrix of each region based on the motion vector of each region. For example, as shown in FIGS. 6A and 6B, if motion vector in region A is (M, N), a search matrix in rectangular configuration may be generated, which includes either (x+M, y+N) 603 and (x−M, y−N) 605, or (x+M/2, y+N/2) 613 and (x−M/2, y−N/2) 615, with respect to a reference point (x, y) 601 and 611 corresponding to region A.

The portable terminal searches for the pixels in the search matrices of the first and second images having a similar saturation, to find out a point representing the same location of an object of the two images in step 215. Referring to FIGS. 7A and 7B, if a 5×3 search matrix 701 is generated based on the first image of low brightness and the second image of high brightness, a pixel 712 which has the same saturation as that of a pixel 710 of the search matrix 701 of the first image, is searched in the search matrix of the second image.

The portable terminal estimates a compensated saturation based on the two pixels searched from the first and second images, compensates the saturation of the corresponding pixel of the first image based on the estimated saturation, and obtains a final image by compensating the brightness of the corresponding pixel of the first image to the brightness of the corresponding pixel of the second image in step 217. The compensated saturation of the first image may be obtained by averaging saturations of two pixels searched from the same point of the two images, or alternatively, the greater or smaller saturation of the two pixels may be selected as the compensated saturation. The first image has less trembling and represents clear boundary between the object and the background by closing the iris at short intervals, and the second image has more trembling and represent a rather unclear boundary between the object and the background by closing the iris at relatively longer intervals. In this case, a stabilized image can be obtained, where the image is compensated for the trembling by changing saturation and brightness of the first image based on the second image.

The portable terminal proceeds to step 219 to display the trembling-compensated image on the display unit 110, and terminates the process according to the present invention.

As explained above, according to the present invention, a portable terminal obtains two images of different brightness by adjusting the iris, generates motion vectors of the two obtained images according to respective regions, finds the locations of the two images which represent the same part of the object being photographed, and compensates brightness and saturation accordingly. As a result, even when an image has movements varying at respective regions due to trembling of a user, a compensated image showing a clear boundary can be provided.

Alternate embodiments of the present invention can also comprise computer readable codes on a computer readable medium. A computer readable medium may include any data storage device that can store data that can be read by a computer system. Examples of such a computer readable medium include magnetic storage media (such as ROM, floppy disks, and hard disks, among others), optical recording media (such as CD-ROMs or DVDs), storage mechanisms such as carrier waves (such as transmission through the Internet), etc. A computer readable medium can also be distributed over network coupled computer systems so the computer readable code is stored and executed in a distributed fashion. Also, functional programs, codes, code segments, etc., for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for compensating trembling of a portable terminal, the method comprising:
    obtaining first and second images having different brightness by closing an iris within different intervals;
    computing motion vectors at respective regions of the first and second images and generating search matrices of the respective regions;
    searching locations having a similar saturation in the search matrices of the first and second images; and
    compensating saturation or brightness of the first image,
    wherein searching locations having a similar saturation comprises:
    computing saturation and brightness of each pixel of the first and second images;
    determining saturation of a pixel existing within the search matrix of the first image; and
    searching for a pixel having a saturation similar to the determined saturation within the search matrix of the second image, which corresponds to the search matrix of the first image.

2. The method of claim 1, wherein obtaining the first image and the second image comprises:
    obtaining the first image having lower brightness than brightness of the second image by closing the iris within a first interval; and
    obtaining the second image having higher brightness than brightness of the first image by closing the iris within a second interval.

3. The method of claim 2, wherein computing motion vectors comprises:
    comparing computed motion vectors at the respective regions with reference values and determining whether trembling is generated and whether the trembling is compensatable; and
    upon determination that trembling is generated and that the trembling is compensatable, generating the search matrices of the respective regions.

4. The method of claim 3, further comprising displaying the second image on a display unit upon determination that trembling is not generated.

5. The method of claim 3, further comprising displaying a message indicating that the trembling cannot be compensated on a display unit upon determination that trembling is generated, and the trembling is not compensatable.

6. The method of claim 2, wherein compensating saturation and brightness comprises:
    selecting one of an average saturation of the two searched locations and the saturation of one of the searched locations;
    selecting brightness of the location searched from the second image among the two searched locations; and changing saturation or brightness of the first image according to the selected saturation and brightness.

7. An apparatus for compensating trembling of a portable terminal, the apparatus comprising:
- a camera for obtaining a first and second images having different brightness by closing an iris within different intervals; and
- an image processing unit for computing motion vectors at respective regions of the first and second images and generating search matrices of the respective regions, searching for similar locations in the search matrices of the first and second images and compensating saturation or brightness of the first image,
- wherein searching for similar locations in the search matrices includes computing saturation and brightness of each pixel of the first and second images, determining saturation of a pixel existing within the search matrix of the first image, and searching for a pixel having a saturation similar to the determined saturation within the search matrix of the second image, which corresponds to the search matrix of the first image.

8. The apparatus of claim 7, wherein the first image has lower brightness than brightness of the second image by closing the iris within a first interval, and the second image has higher brightness than brightness of the first image by closing the iris within a second interval.

9. The apparatus of claim 8, wherein the image processing unit comprises:
- a trembling determining unit for computing the motion vectors at respective regions of the first and second images, comparing the computed motion vectors with reference values, and determining whether trembling is generated and whether the trembling is compensatable; and
- a trembling compensating unit for generating the search matrices of the respective regions, searching locations having a similar saturation in the search matrices of the first and second images, and compensating saturation and brightness of the first image when trembling is generated and the trembling is compensatable.

10. The apparatus of claim 8, wherein the locations are obtained by searching pixels having similar saturations to each other in search matrices of the first and second images.

11. The apparatus of claim 8, wherein the image processing unit changes the saturation of the searched location from the first image according to one of an average saturation of the two searched images and the saturation of one of the first and second images.

12. The apparatus of claim 8, wherein the image processing unit changes the brightness of the searched location of the first image according to the brightness of the searched location of the second image.

13. A method for compensating trembling of a portable terminal, the method comprising:
- obtaining two images having different brightness by adjusting an iris;
- searching locations having a similar saturation in the respective regions of the two images using search matrices based on the motion vectors of the two images; and
- compensating saturation or brightness of an image having lower brightness of the two images using the searched location,
- wherein searching locations having a similar saturation comprises:
- computing saturation and brightness of each pixel of the first and second images;
- determining saturation of a pixel existing within the search matrix of the first image; and
- searching for a pixel having a saturation similar to the determined saturation within the search matrix of the second image, which corresponds to the search matrix of the first image.

14. A portable terminal for compensating trembling, the portable terminal comprising:
- means for obtaining two images having different brightness by adjusting an iris;
- means for searching locations having a similar saturation in the respective regions of the two images using search matrices based on the motion vectors of the two images; and
- means for compensating saturation or brightness of an image having lower brightness of the two images using the searched locations,
- wherein searching locations having a similar saturation comprises:
- computing saturation and brightness of each pixel of the first and second images;
- determining saturation of a pixel existing within the search matrix of the first image; and
- searching for a pixel having a saturation similar to the determined saturation within the search matrix of the second image, which corresponds to the search matrix of the first image.

15. A computer-readable recording medium having recorded thereon a program for compensating trembling in a portable terminal, the program comprising:
- a first code segment, for obtaining two images having different brightness by adjusting an iris;
- a second code segment, for searching locations having a similar saturation in the respective regions of the two images using search matrices based on the motion vectors of the two images; and
- a third code segment, for compensating saturation or brightness of an image having lower brightness of the two images using the searched locations,
- wherein searching locations having a similar saturation comprises:
- computing saturation and brightness of each pixel of the first and second images;
- determining saturation of a pixel existing within the search matrix of the first image; and
- searching for a pixel having a saturation similar to the determined saturation within the search matrix of the second image, which corresponds to the search matrix of the first image.

* * * * *